No. 740,893. PATENTED OCT. 6, 1903.
C. W. MILLER.
PIPE BENDING TOOL.
APPLICATION FILED APR. 1, 1903.
NO MODEL.
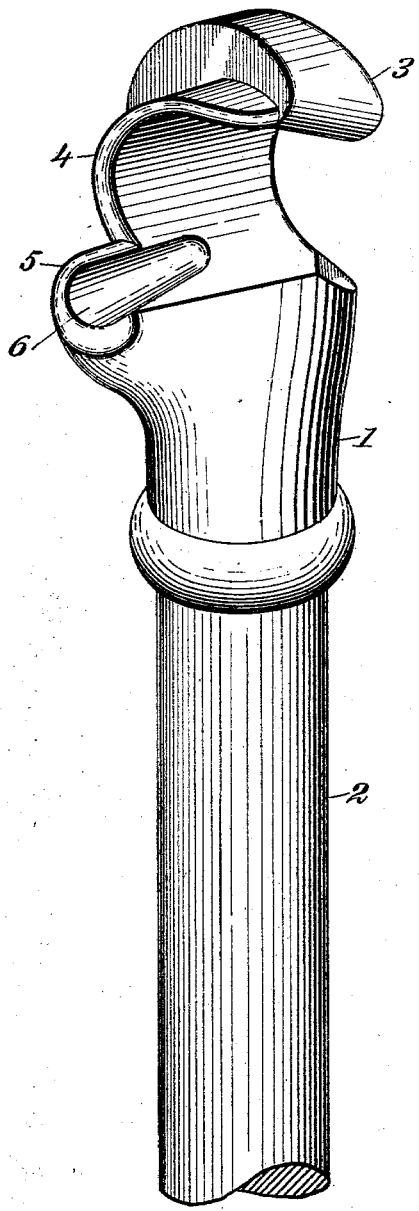
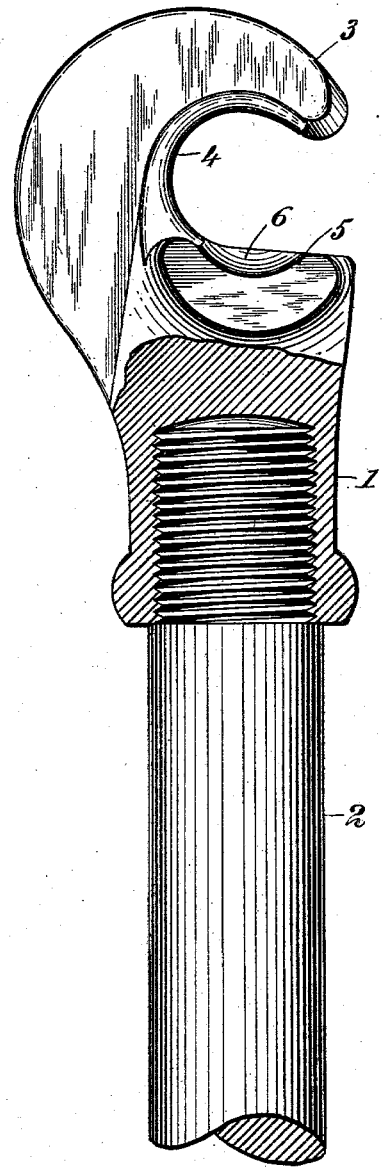
WITNESSES:
INVENTOR
Constantine W. Miller
BY
ATTORNEYS.

No. 740,893. Patented October 6, 1903.

UNITED STATES PATENT OFFICE.

CONSTANTINE W. MILLER, OF NEW YORK, N. Y.

PIPE-BENDING TOOL.

SPECIFICATION forming part of Letters Patent No. 740,893, dated October 6, 1903.

Application filed April 1, 1903. Serial No. 150,546. (No model.)

*To all whom it may concern:*

Be it known that I, CONSTANTINE W. MILLER, a citizen of the United States, and a resident of the city of New York, borough of Manhattan, in the county and State of New York, have invented a new and Improved Pipe-Bending Tool, of which the following is a full, clear, and exact description.

This invention relates to improvements in tools for bending metal pipes, an object being to provide a bending-tool by means of which a very considerable pressure may be brought to bear upon the pipe or tube, thus making it possible to bend pipes of comparatively rigid metal with very little manual exertion and without danger of breaking the pipe at the bend.

I will describe a pipe-bending tool embodying my invention and then point out the novel features in the appended claims.

Reference is to be had to the accompanying drawings, forming a part of this specification, in which similar characters of reference indicate corresponding parts in both the figures.

Figure 1 is a perspective view of a pipe-bending tool embodying my invention; and Fig. 2 is a side elevation thereof, partly in section.

The pipe-bending tool comprises a socket member 1, which is interiorly screw-threaded to receive the screw of an operating handle or lever 2. On the head of this socket member is a hook-shaped member 3 for engaging with a pipe, and extended laterally from one side of this hook 3 is a curved plate-like member 4, which forms a wide bearing on the pipe, and also extended laterally from the base portion of this curved member 4 is an extension 5, which forms the fulcrum-bearing against the pipe. This extension 5, as clearly shown, is concaved, as at 6, to receive the pipe.

In the operation the hook member 3 is to be engaged over the pipe, with the fulcrum part 5 engaging with the pipe at the side in the direction in which the pipe is to be bent. Then by moving the lever or handle 2 in the direction of the projection 5 the pipe or tube may be readily bent.

The projection 4 not only serves the purpose above mentioned, but after the bending is performed the said projection will cause the pipe to be thrown out of the bender upon giving it a slight twist or backward movement.

Having thus described my invention, I claim as new and desire to secure by Letters Patent—

1. A pipe-bending tool, comprising a head, a hook member on said head, a laterally-curved projection at one side of the hook member, and a projection from the base of said curved member, forming a fulcrum-bearing.

2. A pipe-bending tool, comprising a socket member, a hook member on the head portion of said socket member, a curved member extended laterally from one side of the hook member, and a projection at the base of said curved member, the said projection being transversely concaved.

3. A pipe-bending tool, comprising a hook member, and two projections extended laterally from one side of the hook member, one of said projections being longer than the other.

In testimony whereof I have signed my name to this specification in the presence of two subscribing witnesses.

CONSTANTINE W. MILLER. [L. S.]

Witnesses:
JOSEPH RINGLER,
JOSEPH W. JOHNSON.